(12) United States Patent
Lee

(10) Patent No.: US 8,081,942 B1
(45) Date of Patent: Dec. 20, 2011

(54) METHOD AND APPARATUS FOR MUTING BASED ON A CONSTANT MODULUS INDICATION

(75) Inventor: Chris Cheng-Chieh Lee, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 833 days.

(21) Appl. No.: 12/152,675

(22) Filed: May 14, 2008

Related U.S. Application Data

(60) Provisional application No. 60/917,824, filed on May 14, 2007.

(51) Int. Cl.
*H04B 1/16* (2006.01)
(52) U.S. Cl. ............... 455/212; 455/218; 455/296
(58) Field of Classification Search ............. 455/194.1, 455/194.2, 210, 212, 214, 217, 218, 219, 455/220, 232.2, 254, 295, 296; 375/343, 375/347, 350, 351
See application file for complete search history.

(56) References Cited

U.S. PATENT DOCUMENTS

| | | | |
|---|---|---|---|
| 5,390,344 A | | 2/1995 | Nagata |
| 5,410,751 A | * | 4/1995 | Yokoyama ............... 455/212 |
| 5,745,845 A | * | 4/1998 | Suenaga et al. .......... 455/194.1 |
| 6,456,833 B1 | * | 9/2002 | Sessink ..................... 455/212 |
| 2003/0157914 A1 | * | 8/2003 | Li et al. .................... 455/296 |
| 2008/0287072 A1 | * | 11/2008 | Elenes et al. ............. 455/73 |

FOREIGN PATENT DOCUMENTS

EP 0 932 253 A2 7/1999

* cited by examiner

*Primary Examiner* — Thanh Le

(57) ABSTRACT

A constant modulus indicator (CMI) measure is calculated for a received signal having a constant modulus component C and a noise component N. The CMI measure indicates a ratio of an energy of C to an energy of N. A determination of whether to attenuate a derived signal is made based on the CMI measure, wherein the derived signal is generated from the received signal. The derived signal is attenuated based on the determination.

37 Claims, 8 Drawing Sheets

METHOD AND APPARATUS FOR MUTING BASED ON A CONSTANT MODULUS INDICATION

CROSS-REFERENCE TO RELATED APPLICATION

The present application claims the benefit of U.S. Provisional Application No. 60/917,824, entitled "Methods and Systems for FM Receiver SoftMute Based on Constant Modulus Indication," filed on May 14, 2007, which is hereby incorporated by reference herein in its entirety.

FIELD OF TECHNOLOGY

The present disclosure relates generally to audio communication systems and, more particularly, to an apparatus and method for muting a signal based on a constant modulus indicator.

DESCRIPTION OF THE RELATED ART

In broadcast radio applications (e.g., 87.8 to 108 MHz in the United States), a frequency modulated (FM) signal is formed of a stereophonic multiplex (MPX) signal containing a modulated addition signal (L+R) and a subcarrier modulated difference signal (L−R), and a pilot tone signal. A radio frequency (RF) receiver will convert this MPX signal into left and right audio signals through a stereo decoder.

When a received FM signal is impaired, the resulting audio signal may include noticeable and unpleasant distortions. For example, if a received FM signal is relatively weak, if there is interference from an adjacent channel, and/or if there is multipath fading, the resultant audio signal may include noise and other unpleasant effects. The audio signal may be muted when a weak or impaired signal is detected so that the audio level of noise and/or other distortions is reduced.

SUMMARY

In one embodiment, a method includes calculating a constant modulus indicator (CMI) measure for a received signal having a constant modulus component C and a noise component N. The CMI measure indicates a ratio of an energy of C to an energy of N. The method also includes determining whether to attenuate a derived signal based on the CMI measure, wherein the derived signal is generated from the received signal. Additionally, the method includes attenuating the derived signal based on the determination.

In another embodiment, an apparatus comprises a constant modulus indicator (CMI) calculator to generate a CMI measure for a received signal having a constant modulus component C and a noise component N. The CMI measure indicates a ratio of an energy of C to an energy of N. The apparatus additionally comprises a muting controller coupled to the CMI calculator to generate a muting control signal based on the CMI measure. Also, the apparatus comprises an attenuator coupled to the muting controller. The attenuator applies attenuation to a derived signal in response to the muting control signal, wherein the derived signal is generated from the received signal.

In yet another embodiment, a method of processing a received signal includes downconverting the received signal to a baseband signal having a constant modulus component C and a noise component N. Additionally, the method includes demodulating the baseband signal to generate demodulated baseband signal, and processing the demodulated baseband signal. Also, the method includes calculating a constant modulus indicator (CMI) measure for the baseband signal. The CMI measure indicates a ratio of an energy of C to an energy of N. The method further includes determining whether to attenuate the demodulated baseband signal based on the CMI measure, and attenuating the demodulated baseband signal based on the determination.

In still another embodiment, a receiver, comprises a downconverter to downconvert a received signal to a baseband signal having a constant modulus component C and a noise component N. The apparatus also comprises a demodulator to generate a demodulated baseband signal, and a signal processor to process the demodulated baseband signal. Additionally, the apparatus comprises a constant modulus indicator (CMI) calculator to generate a CMI measure for the baseband signal. The CMI measure indicates a ratio of an energy of C to an energy of N. The apparatus further comprises a muting controller coupled to the CMI calculator to generate a muting control signal based on the CMI measure, and an attenuator coupled to the muting controller, the attenuator to apply attenuation to the demodulated baseband signal in response to the muting control signal.

In another aspect, a method of attenuating a signal comprises generating a plurality of attenuated signals. Signals in the plurality of attenuated signals are attenuated by different amounts of attenuation. The method also may comprise selecting one of signals in the plurality of attenuated signals as an output signal. The amount of attenuation of the output signal may be changed by changing the amounts of attenuation of the plurality of attenuated signals and/or by selecting a different one of the signals in the plurality of attenuated signals. The plurality of attenuated signals may be generated by generating a first attenuated signal by applying a controllable amount of attenuation. The remaining signals in the plurality of attenuated signals may be generated based on the first attenuated signal by applying different fixed amounts of attenuation to the first attenuated signal. Optionally, the method also may comprise selecting a pair of signals in the plurality of attenuated signals and generating the output signal based on the selected pair of signals.

DETAILED DESCRIPTION

Figure 1:
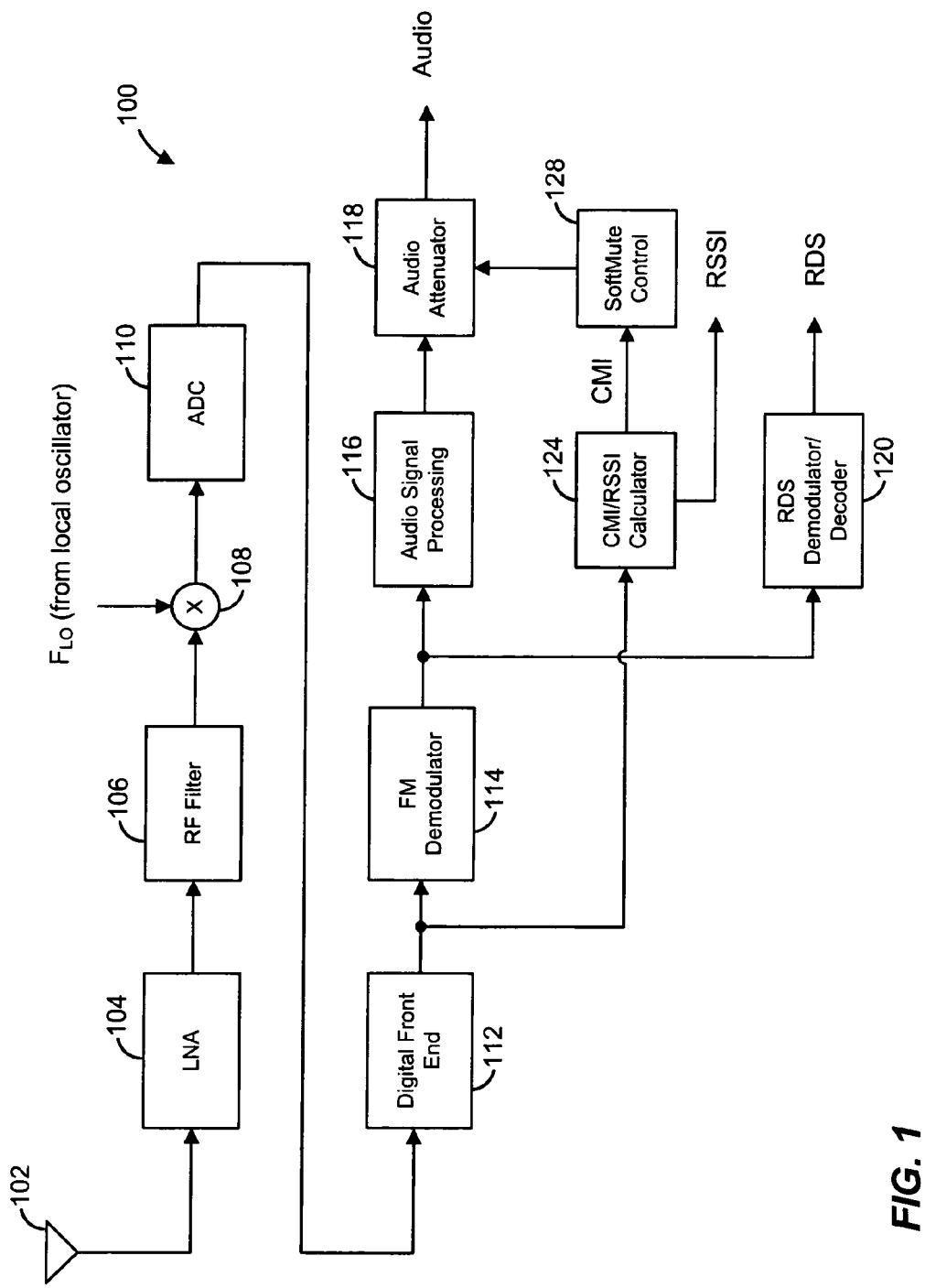
FIG. 1 is a block diagram of an example receiver that may utilize softmute controlled based on a constant modulus indicator (CMI)

The present application describes techniques for detecting when a frequency modulated (FM) audio signal is impaired based on a constant modulus indication (CMI) value. Impaired audio signals that are derived from the FM audio signal may be attenuated to reduce the volume of noise and other unpleasant distortions. A signal derived from the FM audio signal generally refers to a signal that is based on the FM audio signal after the FM audio signal has been frequency demodulated. Examples of such derived signals include a stereo multiplexed (MPX) signal, a decoded audio signal, etc. A perfect FM signal would sit on a constant modulus circle, e.g., a constant circle when the in-phase (I) and quadrature phase (Q) terms of a received signal are plotted. Therefore, when the local oscillator on an RF receiver has a frequency, $F_{LO}$, that approximates the carrier frequency, $F_C$, of the transmitted FM signal, plotting the I and Q terms of the FM channel output from the receiver's digital front end (DFE) circuit will produce values scattered around an ideal circle. The stronger the RF strength of the signal and/or the less impairments to the signal, the more defined and circular the plot of the I and Q terms becomes, i.e., the more localized the scattered points become and the tighter the circular plot. On the other hand, the weaker the RF strength of the signal and/or the more impairments to the signal (e.g., interference, multipath fading, etc.), the less defined and circular the plot of the I and Q terms becomes, and the scattered points become more defused and the plot becomes less defined and less circular. Similarly, the higher the accuracy of $F_{LO}$ to $F_C$, the more defined and circular the plot of the I and Q terms becomes and the more localized the scattered points become and the tighter the circular plot.

The present application proposes utilizing a new metric for assessing the general quality or level of impairment of a radio frequency broadcast signal, which is referred to as a constant modulus indication (CMI) value. To define CMI, the output signal, S, from a DFE may be represented by the expression S=C+N, where C is a constant modulus signal (with a radius r) and where N is a noise signal having a deviation n from that ideal constant modulus signal. The CMI for the expression S may be defined as the ratio of the energy of C to that of N using the following expression, E[signal] indicates the energy of signal:

$$CMI(S) = 10\ \log_{10} \frac{E[C]}{E[N]} = 10\ \log_{10} \frac{r^2}{n^2} \quad \text{(Equation 1)}$$

From Equation 1, it is apparent that as the noise value, N, decreases, and the $F_{LO}$ approaches $F_C$, the value for CMI will increase. A perfect match of $F_{LO}$ to $F_C$ is reflected by C=1 and N=0 would result in a CMI value of infinity if there were no noise or other impairments. It has been found that weak FM signals (e.g., approximately –90 dBm), subject to severe fading, have a CMI measure of near 7 dB. It has also been found that when there is no FM signal or when the FM signal is corrupted with severe distortion and/or other impairments, CMI may be much lower, for example, near 1.5 dB. In one specific implementation, a threshold for determining when an audio signal should be attenuated (because of channel impairments) is set at approximately 6 dB. In other words, if the CMI falls below 6 dB, it is determined that the signal should be attenuated. Of course, different thresholds other than 6 dB may be utilized depending on the particular implementation, desired performance, and/or how the CMI is calculated. For instance, CMI values may be calculated in ways other than specified in Equation 1. More generally, CMI is a measure of the ratio of the energy of the constant modulus signal C to the energy of the noise signal N.

It will be understood noted that although example implementations are described herein in relation to an FM broadcast audio signal, the use of softmute based on CMI calculations may be useful in other contexts as well, such as with other modulation schemes in which the signal exhibits a constant modulus or that may be analyzed using a constant modulus algorithm, such as a known constant modulus algorithm. Such modulation schemes include phase shift keying (PSK), frequency shift keying (FSK), quadrature-phase shift keying (QPSK), minimum shift keying (MSK), or Gaussian minimum shift keying (GMSK) modulated signals. Furthermore, examples herein reference a particular RF frequency band; however any RF frequency band may be used, e.g., VHF, UHF, SHF, or EHF. Examples include RF allocations within a single band such as the 800 MHz, 900 MHz, or 1900 MHz cellular allocations, all of which are in the UHF band. Further still, the applied channel bandwidths may vary, e.g., 30 kHz, 200 kHz, 1250 MHz, or 5 MHz. Attenuation may be applied to a signal derived from the modulated signal (which exhibits a constant modulus or that may be analyzed using a constant modulus algorithm). A derived signal generally refers to a signal that is based on the modulated signal after the modulated signal has been demodulated.

FIG. 1 is a block diagram of an example FM audio receiver 100 that implements a softmute function based on CMI calculations. The receiver 100 includes an RF antenna 102 for receiving an RF signal. The antenna 102 is coupled to a low noise amplifier (LNA) 104, and an output of the LNA 104 is coupled to an RF filter 106. An output of the RF filter 106 is coupled to a mixer 108, which mixes the output of the RF filter 106 with a local oscillator output signal ($F_{LO}$). An output of the mixer 108 is converted to a digital signal by an analog-to-digital converter (ADC) 110, and an output of the ADC 110 is coupled to a digital front end processor (DFE) 112 for channelization. The DFE 112 performs channelization to select a channel of interest in the FM signal, by for example, converting the FM signal to an intermediate frequency (IF) and/or baseband frequency, performing channel filtering on the converted RF signal, and possibly in some examples performing despreading. In one implementation, the DFE 112 may include a bandwidth selection filter, such as a dynamic bandwidth selection filter. An output of the DFE 112 may be a frequency modulated (FM) baseband signal, and the output of the DFE 112 may be coupled to an FM demodulator 114. As is known, the RF filter 106, the mixer 108, the ADC 110 and the DFE 112 act to downconvert a desired signal from a carrier frequency to a baseband signal.

An output of the FM demodulator 114 may be coupled to an audio signal processor 116, which may include one or more of a filter to select audio signals from other signals such as Radio Data System (RDS) signals, a stereo decoder, a deemphasis filter, etc. An output of the audio signal processor 116 is coupled to an audio attenuator 108. The audio attenuator 108 may be controlled to cause an audio signal to be attenuated when a CMI signal indicates that the signal is impaired.

The output of the FM demodulator 114 also may be coupled to an RDS demodulator/decoder 120, which generates an RDS signal.

Additionally, the output of the DFE 112 may be coupled to a constant modulus indicator (CMI) calculator 124, which may be implemented in hardware as a dedicated digital signal processor circuit or in software or firmware as computer executable instructions on a computer-readable medium accessible to a processor (such as a digital signal processor) and having instructions for implementing the procedures described herein. Also, the CMI calculator 124 may be implemented as a combination of hardware, software, and/or firmware. In implementations in which the CMI calculator 124 is implemented at least partially in firmware and/or software, the processor that executes the instructions for calculating CMI may also perform other operations of the receiver 100, such as at least some of the operations of the DFE 112 and/or the FM demodulator 114, the audio signal processor 116, etc. Although in the example illustrated in FIG. 1, the CMI calculator 124 is shown as receiving the output of the DFE 112, in another implementation in which the DFE 112 includes a dynamic bandwidth selective filter, the CMI calculator 124 optionally may receive the input to the bandwidth selective filter. In other words, the CMI calculator 124 may be coupled to either the input to the dynamic bandwidth selective filter or the output of the dynamic bandwidth selective filter.

Optionally, the CMI calculator 124 may also calculate an RSSI signal, which may be used for other operations or features of the receiver 100. Additionally, the RSSI signal, if it is calculated, optionally may be utilized, in addition to the CMI signal, for implementing softmute.

An output of the CMI calculator 124 may be coupled to a softmute control block 128. The softmute control block 128 may generate an output based on the CMI signal, and the output of the softmute control block 128 is coupled to the audio attenuator 118. Generally, the softmute control block 128 controls the audio attenuator 118 to implement a softmute when the CMI signal indicates that the FM signal is impaired. In other words, the softmute control block 128 controls the audio attenuator 118 to attenuate the audio signal when the CMI signal indicates that the FM signal is impaired.

Figure 2:
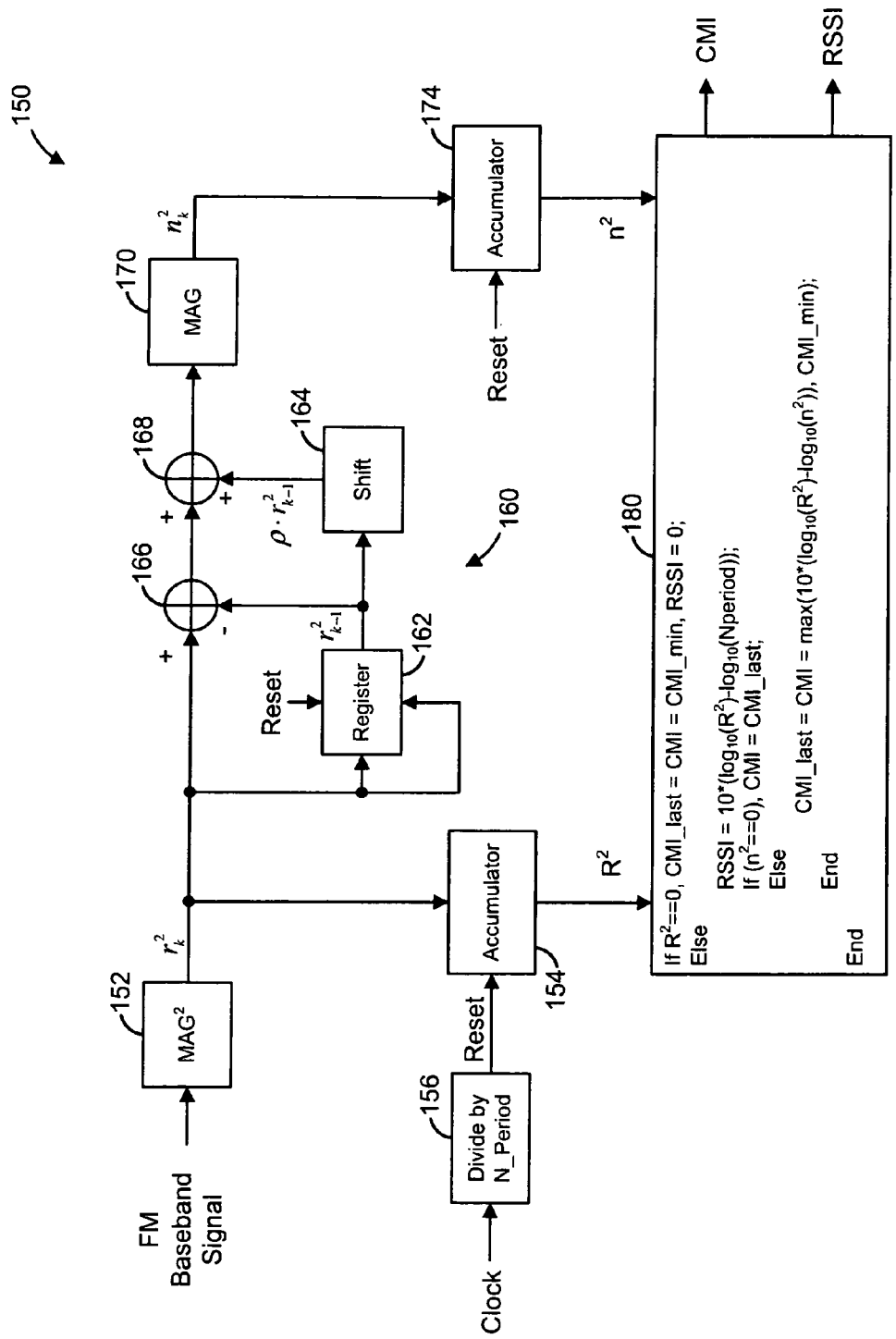
FIG. 2 is a block diagram of an example CMI/Received Signal Strength Indicator (RSSI) calculator that may be utilized with the receiver of FIG. 1.

FIG. 2 is a block diagram of an example CMI/RSSI calculator 150 that may be utilized as the CMI/RSSI calculator 124 of FIG. 1. It is to be understood, however, that the CMI/RSSI calculator 124 of FIG. 1 may be different than the CMI/RSSI calculator 150. Additionally, the CMI/RSSI calculator 150 may be utilized in systems other than the example receiver 100 of FIG. 1.

The CMI/RSSI calculator 150 includes a magnitude-squared calculator 152 that receives an FM baseband signal. The magnitude-squared calculator 152 calculates the squared magnitude of the FM baseband signal, and the output of the magnitude-squared calculator 152 is provided to a block accumulator 154. The block accumulator 154 accumulates the output of the magnitude-squared calculator 152 over a block of samples to generate an $R^2$ signal, which generally is a measure of the FM signal energy. A clock divider 156 receives a clock, which corresponds to the FM baseband signal, and divides the clock so that a reset signal pulse is generated once per block of samples. The reset signal is provided to the block accumulator 154.

The output of the magnitude-squared calculator 152 is also coupled to a signal energy prediction generator 160. Generally, the signal energy prediction generator 160 generates a prediction of the output of the magnitude-squared calculator 152 based on the previous output of the magnitude-squared calculator 152 according to:

$$\bar{r}_k^2 = (1-\rho)r_{k-1}^2 \quad \text{(Equation 2)}$$

where $\bar{r}_k^2$ is the prediction of the output of the magnitude-squared calculator 152 (measure of signal energy), and $r_{k-1}^2$, is the previous output of the magnitude-squared calculator 152. The prediction of the signal energy may be used to calculate a measure of the noise energy. For example, the noise energy $n_k^2$ may be calculated based on the difference between the signal energy and the prediction:

$$n_k^2 = |r_k^2 - \bar{r}_k^2| = |r_k^2 - (1-\rho)r_{k-1}^2| = |(r_k^2 - r_{k-1}^2) + \rho \cdot r_{k-1}^2| \quad \text{(Equation 3)}$$

where $\rho$ is a parameter that is near zero. The energy prediction generator 160 may be integrated with generation of the noise energy $n_k^2$ so that explicit calculation of $(1-\rho)r_{k-1}^2$. For example, the prediction of the signal energy may be integrated with the calculation of $n_k^2 = |(r_k^2 - r_{k-1}^2) + \rho \cdot r_{k-1}^2|$.

The energy prediction generator 160 includes a register 162 that delays the output of the magnitude-squared calculator 152. In particular, the register 162 includes a data input coupled to the output of the magnitude-squared calculator 152. The register 162 also includes a reset load input for loading a value into the register upon activation of the reset signal. The reset load input also may be coupled to the output of the magnitude-squared calculator 152. An output of the register 162 is provided to a right-shifting device 164 that implements the multiplication $\rho \cdot r_{k-1}^2$. The output of the register 162 is also provided to a subtractor 166. The output of the magnitude-squared calculator 152 is also provided to the subtractor 166, and the subtractor 166 implements a calculation corresponding to $r_k^2 - r_{k-1}^2$. An output of the subtractor 166 is coupled to an input of an adder 168. Another input of the adder is coupled to an output of the right-shifting device 164, and the adder 168 implements a calculation corresponding to $(r_k^2 - r_{k-1}^2) + \rho \cdot r_{k-1}^2$. An output of the adder 168 is coupled to a magnitude calculator 170. The magnitude calculator 170 calculates the magnitude of the output of the adder 168 and generates an output corresponding to the result of Equation 3.

The output of the magnitude calculator 170 is provided to a block accumulator 174. The block accumulator 174 accumulates the output of the magnitude calculator 170 over the block of samples to generate an $n^2$ signal, which generally is a measure of the noise energy.

The outputs of the block accumulator 154 and the block accumulator 174 are coupled to a computational block 180 that generates a CMI signal and, optionally, an RSSI signal based on the $R^2$ signal and the $n^2$ signal. In particular, CMI is generally calculated according to:

$$\text{CMI} = \text{CMI\_min, if } R^2 = 0; \quad \text{(Equation 4)}$$

$$\text{CMI} = \text{CMI\_last, if } R^2 \neq 0 \text{ and } n^2 = 0; \quad \text{(Equation 5)}$$

otherwise, $$CMI = \max\left(10 \log_{10}\left(\frac{R^2}{n^2}\right), \text{CMI\_min}\right) \quad \text{(Equation 6)}$$

where CMI_min is a chosen minimum allowable value of CMI, and CMI_last is the previous value of CMI. The value of CMI_min may be chosen based on the particular implementation.

If the computational block 180 also generates an RSSI signal, the RSSI signal may be generally calculated according to:

$$\text{RSSI} = 0, \text{ if } R^2 = 0; \quad \text{(Equation 7)}$$

$$\text{otherwise, RSSI} = 10 \log_{LO}(R^2/N\_\text{period}) \quad \text{(Equation 8)}$$

where N_period is the number baseband samples in the block over which the $R^2$ signal and the $n^2$ signal are calculated.

The computational block 180 may be implemented in hardware, software, firmware, or some combination of hardware, software, and/or firmware. For example, the computational block 180 may comprise a logic circuit. As another example, the computational block 180 may be implemented by a processor coupled to a memory that stores computer readable instructions to be executed by the processor. More generally, the example CMI/RSSI calculator 150 may be implemented in hardware, software, firmware, or some combination of hardware, software, and/or firmware. For instance, each block in the CMI/RSSI calculator 150 may comprise a logic circuit, or may be implemented by a processor coupled to a memory that stores computer readable instructions to be executed by the processor.

Figure 3:
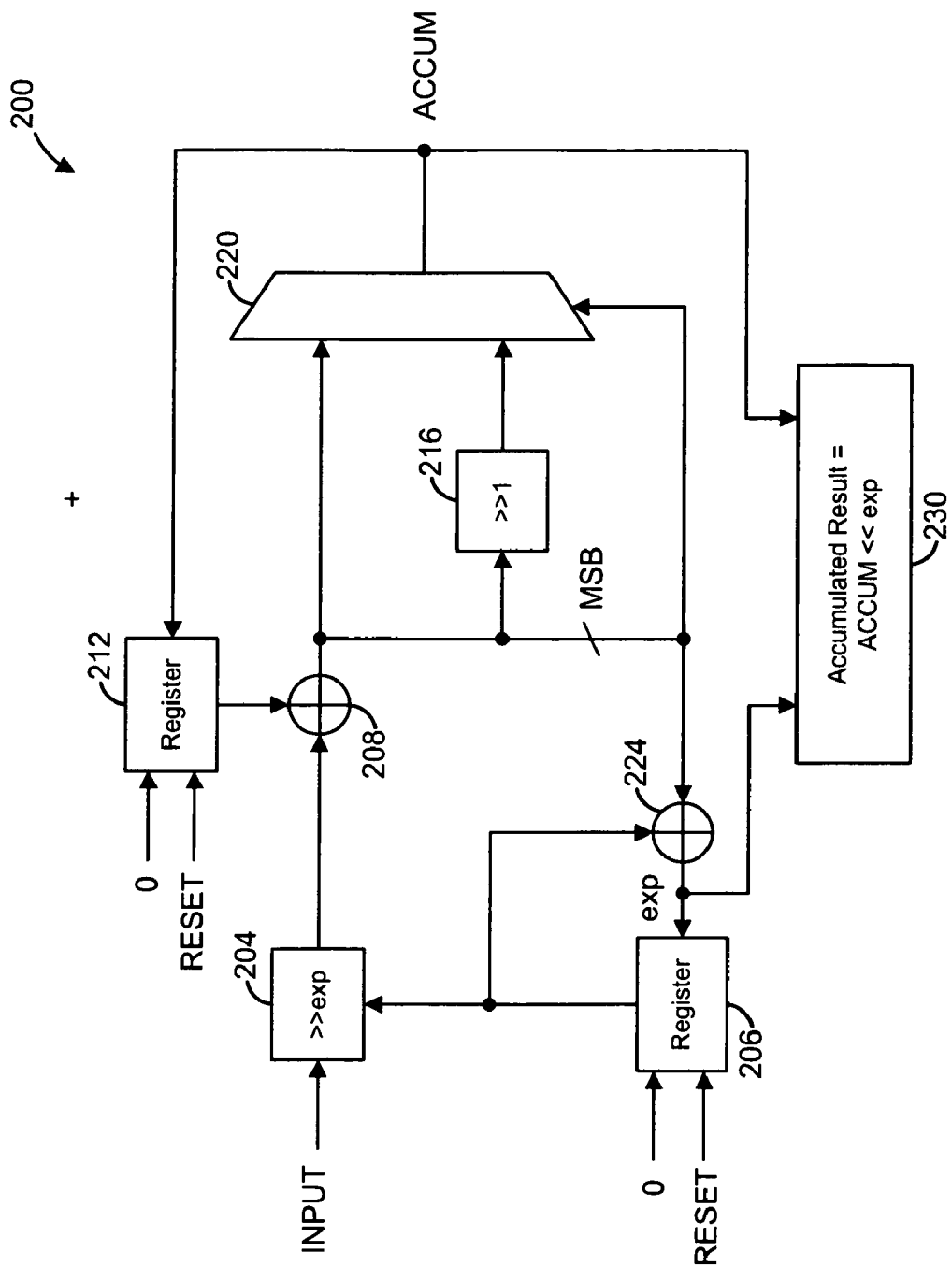
FIG. 3 is a block diagram of an example accumulator that may be utilized with the CMI/RSSI calculator of FIG. 2.

FIG. 3 is a block diagram of an example accumulator 200 that may be utilized as the accumulator 154 and/or the accumulator 174 of FIG. 2. It will be understood, however, that the accumulator 154 and/or the accumulator 174 of FIG. 2 may be different than the accumulator 200 of FIG. 3.

The accumulator 200 includes a right-shifting device 204 that receives as an input data input to the accumulator 200. The right-shifting device 204 generates an output that corresponds to the data input right-shifted by exp bits, where exp is a positive integer received from a register 206 coupled to the right-shifting device 204. An output of the right-shifting device 204 is coupled to an input of an adder 208. Another input of the adder 208 is coupled to an output of a register 212, which may store a previous accumulation result (ACCUM).

An output of the adder 208 is coupled to a right-shifting device 216, which right-shifts the output of the adder 208 by one bit. The output of the adder 208 and an output of the right-shifting device 216 are coupled to data inputs of a multiplexer 220. Additionally, the most significant bit (MSB) of the output of the adder 208 is coupled to a control input of the multiplexer 220. If the MSB is zero, the output of the adder 208 is selected, and if the MSB is one, the output of the right-shifting device 216 is selected. An output of the multiplexer 220 is coupled to an input of the register 212.

The MSB is also coupled to an input of an adder 224. Another input of the adder 224 is coupled to the output of the register 206. Thus, when the MSB is one, the value exp is incremented and stored in the register 206. If the MSB is zero, the value exp stored in the register 206 remains unchanged. Each of the registers 206 and 212 has a reset load input coupled to a zero value, so that when the reset signal is activated, the value zero is loaded into each of the registers 206 and 212.

A left-shifting device 230 is coupled to the output of the multiplexer 220 and the output of the adder 224. The left-shifting device 230 left-shifts the output of the multiplexer 220 by exp bits. Typically, the left-shifting device 230 will have a wider width than the output of the multiplexer 220.

In operation, the accumulator 200 generally accumulates energy values. When the MSB of the next accumulation result (ACCUM) becomes one, the accumulation result is essentially right-shifted by one bit. Additionally, the following energy values will also be right-shifted by one bit. This may be repeated and the value exp may continue to increment. At the end of the block, the result may then be left-shifted by exp bits.

Referring again to FIG. 2, the output of the accumulator 154 corresponds to the $R^2$ input to the computational block 180, and the output of the accumulator 174 corresponds to the $n^2$ input to the computational block 180. If the accumulators 154 and 174 are implemented as in FIG. 3, then Equations 6 and 8 can be rewritten in terms of ACCUM and exp from FIG. 3. For clarity, the ACCUM and exp values corresponding to the accumulator 154 are referred to as R_ACCUM and R_exp, and the ACCUM and exp values corresponding to the accumulator 174 are referred to as N_ACCUM and N_exp. Equations 6 and 8 rewritten are:

$$CMI = \max(3.01(\log_2(R\_ACCUM) - \log_2(n\_ACCUM) + R\_exp - N\_exp), CMI\_min) \quad \text{(Equation 6a)}$$

$$RSSI = 3.01(\log_2(R\_ACCUM) - \log_2(N\_Period) + R\_exp) \quad \text{(Equation 8a)}$$

Figure 4:
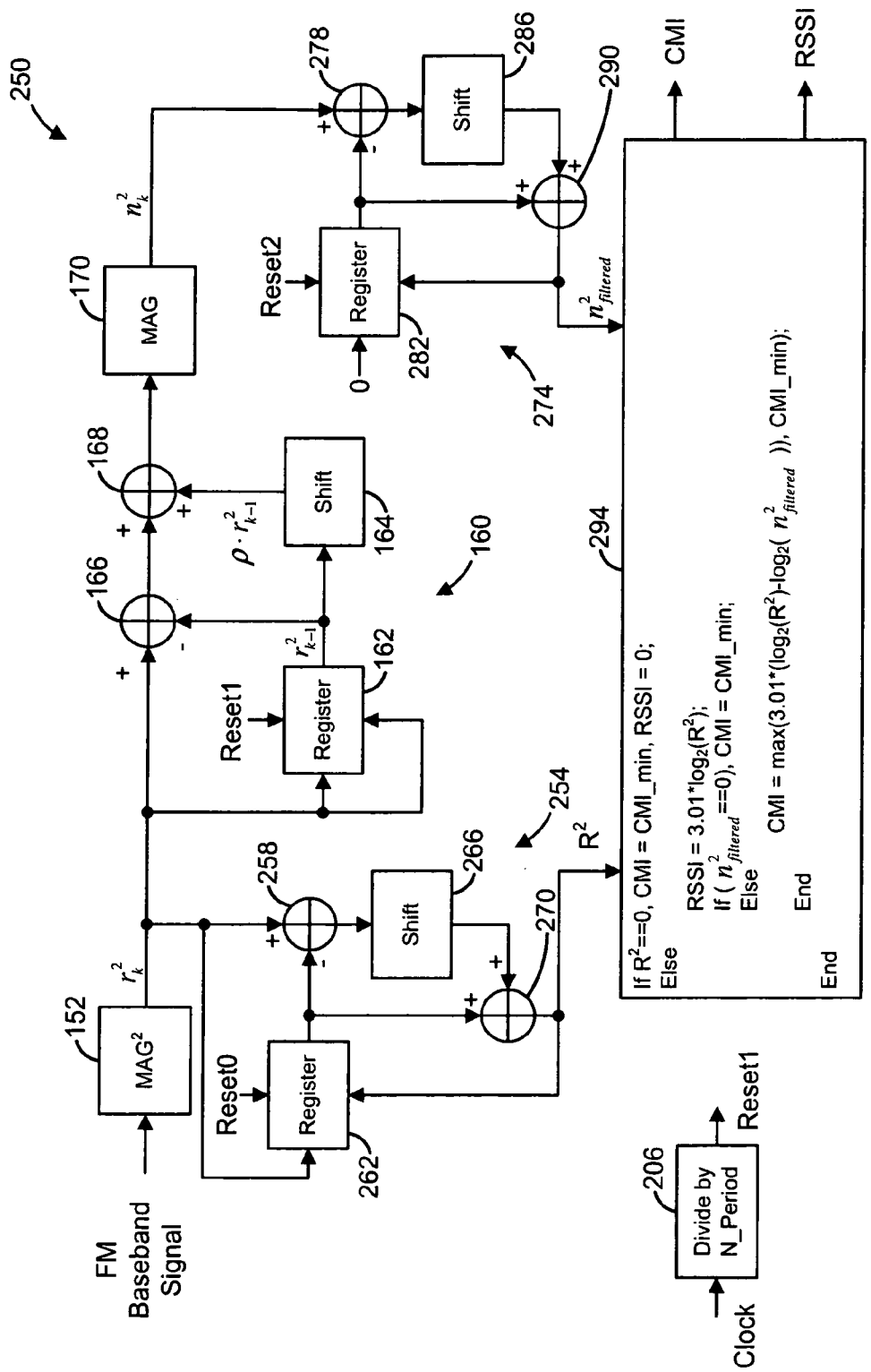
FIG. 4 is a block diagram of another example CMI/RSSI calculator that may be utilized with the receiver of FIG. 1.

FIG. 4 is a block diagram of another example CMI/RSSI calculator 250 that may be utilized as the CMI/RSSI calculator 124 of FIG. 1. It is to be understood, however, that the CMI/RSSI calculator 124 of FIG. 1 may be different than the CMI/RSSI calculator 250. Additionally, the CMI/RSSI calculator 250 may be utilized in systems other than the example receiver 100 of FIG. 1.

The CMI/RSSI calculator 250 includes a magnitude-squared calculator 152 that receives an FM baseband signal that may be same as or similar to the magnitude-squared calculator 152 of FIG. 2. The magnitude-squared calculator 152 calculates the squared magnitude of the FM baseband signal, and the output of the magnitude-squared calculator 152 is provided to an infinite impulse response (IIR) filter 254, which generally may be a low-pass filter. The filter 254 filters the output of the magnitude-squared calculator 152 to generate an $R^2$ signal, which generally is a measure of the FM signal energy.

The filter 254 may include a subtractor 258 having an input coupled to an output of the magnitude-squared calculator 152. Another input of the subtractor 258 is coupled to an output of a register 262 that stores a previous value of the $R^2$ signal. An output of the subtractor 258 is coupled to an input of a right-shifting device 266, which right-shifts by a number of bits est_time0. An output of the right-shifting device 266 is coupled to an input of an adder 270. Another input of the adder 270 is coupled to the output of the register 262. An output of the adder 270 is coupled to an input of the register 262. The register 262 also includes a reset load input for loading a value into the register 262 upon activation of the reset signal. The reset load input also may be coupled to the output of the magnitude-squared calculator 152.

The output of the adder 270 is the signal $R^2$, which is generated according to:

$$R_k^2 = R_{k-1}^2 + \alpha_R(r_k^2 - R_{k-1}^2) = \alpha_R r_k^2 + (1-\alpha_R)R_{k-1}^2 \quad \text{(Equation 9)}$$

where $\alpha_R$ is a parameter corresponding to a right-shift device 266 by est_time0 bits. Generally, for smaller values of $\alpha_R$ (i.e., more right-shifts), the signal $R^2$ will adjust more rapidly, whereas for larger values of $\alpha_R$ (i.e., less right-shifts), the signal $R^2$ will adjust less rapidly, but will be more accurate. Selection of a particular value $\alpha_R$ may vary depending on the particular implementation.

The output of the magnitude-squared calculator 152 is also coupled to a signal energy prediction generator 160, which may be the same as or similar to the signal energy prediction generator 160 of FIG. 2. A magnitude calculator 170, which may be the same as or similar to the magnitude calculator 170 of FIG. 2, calculates the magnitude of the output of the adder 168 and generates an output corresponding to the result of Equation 3.

The output of the magnitude calculator 170 is provided to an IIR filter 274, which generally may be a low-pass filter. The filter 274 filters the output of the magnitude calculator 170 to generate an $n_{filtered}^2$ signal, which generally is a measure of the noise energy.

The filter 274 may include a subtractor 278 having an input coupled to an output of the magnitude calculator 170. Another input of the subtractor 278 is coupled to an output of a register 282 that stores a previous value of the $n_{filtered}^2$ signal. An output of the subtractor 278 is coupled to an input of a right-shifting device 286, which right-shifts by a number of bits est_time2. An output of the right-shifting device 286 is coupled to an input of an adder 290. Another input of the adder 290 is coupled to the output of the register 282. An output of the adder 290 is coupled to an input of the register 282. The register 282 also includes a reset load input for loading a value into the register 282 upon activation of the reset signal. The reset load input also may be coupled to a zero value.

The output of the adder 290 is the signal $n_{filtered}^2$, which is generated according to:

$$n_{filtered,k}^2 = n_{filtered,k-1}^2 + \alpha_n(n_k^2 - n_{filtered,k-1}^2) = \alpha_n n_k^2 + (1-\alpha_n)n_{filtered,k-1}^2 \quad \text{(Equation 10)}$$

where $\alpha_n$ is a parameter corresponding to a right-shift device 286 by est_time2 bits. Generally, for smaller values of $\alpha_n$ (i.e., more right-shifts), the signal $n_{filtered}^2$ will adjust more rapidly, whereas for larger values of $\alpha_n$ (i.e., less right-shifts), the signal $n_{filtered}^2$ will adjust less rapidly, but will be more accurate. Selection of a particular value $\alpha_n$ may vary depending on the particular implementation.

The outputs of the filter 254 and the filter 274 are coupled to a computational block 294 that generates a CMI signal and, optionally, an RSSI signal based on the $R^2$ signal and the $n_{filtered}^2$ signal. In particular, CMI is generally calculated according to Equation 1 and $$\text{CMI} = \text{CMI\_min, if } R^2 \neq 0 \text{ and } n_{filtered}^2 = 0; \quad \text{(Equation 11)}$$

$$CMI = \max\left(10\log_{10}\left(\frac{R^2}{n_{filtered}^2}\right), \text{CMI\_min}\right), \quad \text{(Equation 12)}$$

$$\text{if } R^2 \neq 0 \text{ and } n_{filtered}^2 \neq 0$$

Equation 12 can be rewritten as:

$$\text{CMI} = \max(3.01(\log_2(R^2) - \log_2(n_{filtered}^2)), \text{CMI\_min}) \quad \text{(Equation 12a)}$$

If the computational block 294 also generates an RSSI signal, the RSSI signal may be generally calculated according to Equation 7 and:

$$\text{RSSI} = 3.01 \log_2(R^2), \text{ if } R^2 \neq 0, \quad \text{(Equation 13)}$$

The computational block 294 may be implemented in hardware, software, firmware, or some combination of hardware, software, and/or firmware. For example, the computational block 294 may comprise a logic circuit. As another example, the computational block 180 may be implemented by a processor coupled to a memory that stores computer readable instructions to be executed by the processor. More generally, the example CMI/RSSI calculator 250 may be implemented in hardware, software, firmware, or some combination of hardware, software, and/or firmware. For instance, each block in the CMI/RSSI calculator 250 may comprise a logic circuit, or may be implemented by a processor coupled to a memory that stores computer readable instructions to be executed by the processor.

Figure 5:
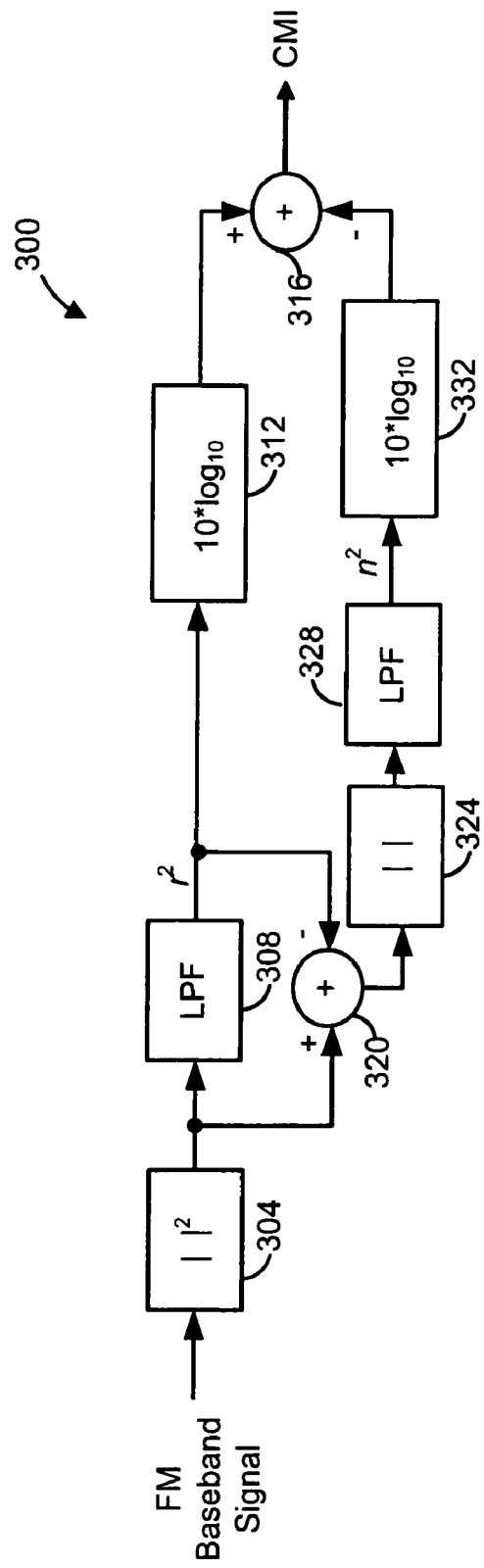
FIG. 5 is a block diagram of yet another example CMI/RSSI calculator that may be utilized with the receiver of FIG. 1.

FIG. 5 is a block diagram of yet another example CMI/RSSI calculator 300 that may be utilized as the CMI/RSSI calculator 124 of FIG. 1. It is to be understood, however, that the CMI/RSSI calculator 124 of FIG. 1 may be different than the CMI/RSSI calculator 300. Additionally, the CMI/RSSI calculator 300 may be utilized in systems other than the example receiver 100 of FIG. 1.

The example CMI/RSSI calculator 300 includes a magnitude-squared calculator 304 that receives an FM baseband signal. The magnitude-squared calculator 304 calculates the squared magnitude of the FM baseband signal, and the output of the magnitude-squared calculator 304 is provided to a low pass filter 308 that filters the magnitude-squared signal to further compensate for fluctuations in the input RF signal. The filter 308 produces a filtered output signal ($r^2$) that, in the illustrated example, is converted to a decibel value by decibel calculator 312. An output of the calculator 312 is coupled to an input of an adder 316.

An output of the magnitude-squared calculator 304 is coupled to a first input of a subtractor 320, and an output of the filter 308 is coupled to a second input of the subtractor 308. The subtractor block 320 inverts either (preferred) the time average signal or the instantaneous energy magnitude signal to produce a difference magnitude signal that reflects the fluctuations in the instantaneous energy magnitude signal from the filtered signal. This difference signal corresponds to the noise portion of the signal in the FM baseband signal. The magnitude of this noise portion is calculated by a magnitude calculator 324 prior to being passed to a low pass filter 328, which a filtered output signal, $n^2$. A decibel calculator 332 determines the decibel level for this noise signal and couples the same to the subtractor 316 which subtracts the noise signal energy from the primary signal energy to produce a CMI.

Figure 6:
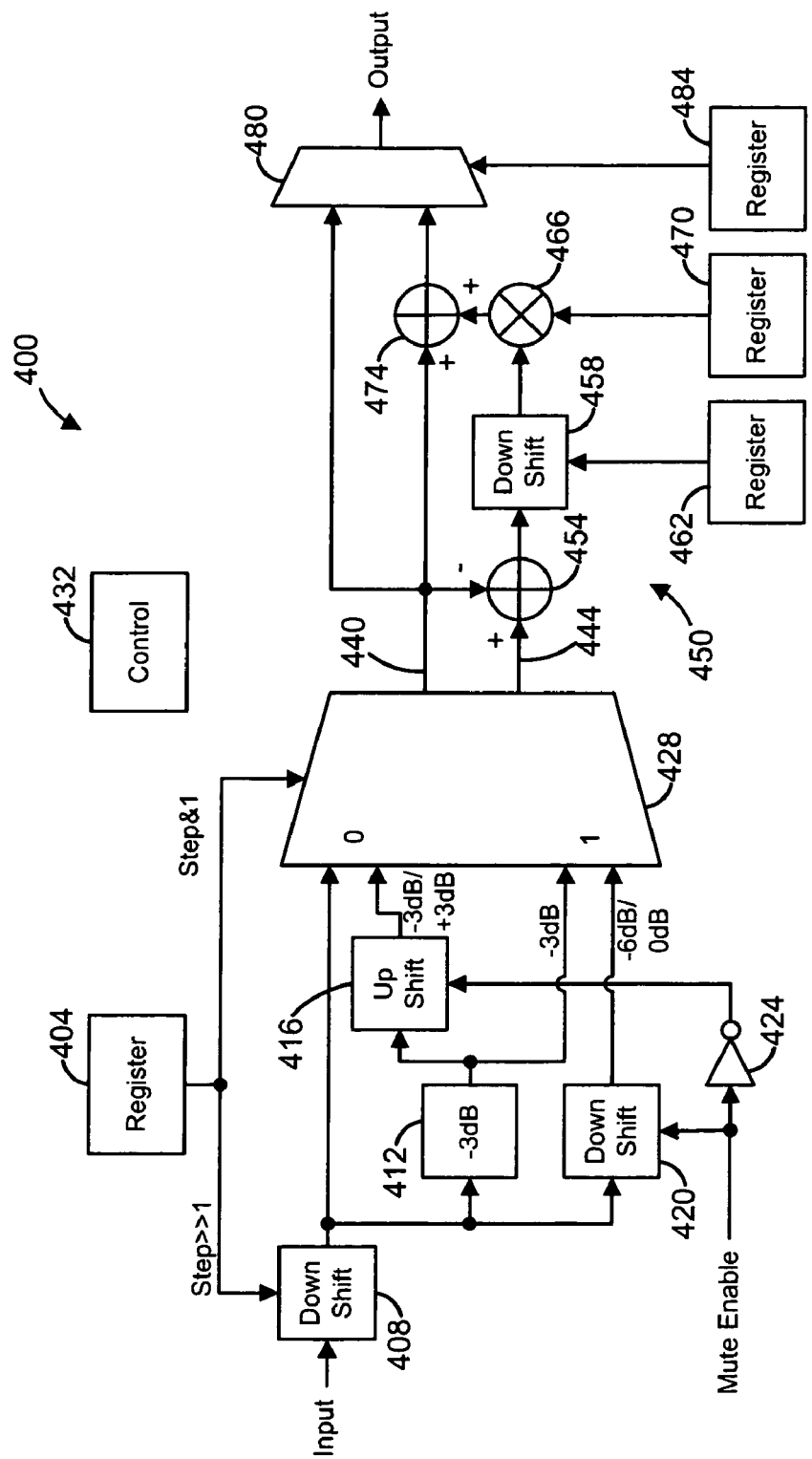
FIG. 6 is a block diagram of an example audio attenuator that may be utilized with the receiver of FIG. 1.

FIG. 6 is a block diagram of an example audio attenuator 400 that may be utilized as the audio attenuator 118 in the receiver 100 of FIG. 1. If the audio attenuator 400 is utilized in the receiver 100, the softmute control block 128 may generate a control signal that indicates whether softmute is ON or OFF. This control signal may be provided to the audio attenuator 400 as a Mute Enable signal. It is to be understood, however, that the audio attenuator 118 of FIG. 1 may be different than the audio attenuator 400. Additionally, the audio attenuator 400 may be utilized in systems other than the example receiver 100 of FIG. 1. The audio attenuator 400 may be implemented in hardware as a dedicated digital signal processor circuit or in software or firmware as computer executable instructions on a computer-readable medium accessible to a processor (such as a digital signal processor) and having instructions for implementing the procedures described herein. Also, the audio attenuator 400 may be implemented as a combination of hardware, software, and/or firmware.

A register 404 may store an indication of how many 3 dB attenuation steps should be applied to the audio signal. A right-shifted version (Step>>1) of the output of the register 404 may be provided as a control input to a right-shifting device 408. Thus, the signal Step>>1 corresponds to the quotient of a division of the output of the register 404 by 2. In other words, the signal Step>>1 corresponds to an indication of how many 6 dB attenuation steps should be applied to the audio signal. The least significant bit of the output of the register 404 (Step&1) indicates whether a 3 dB attenuation step should also be applied. For example, if the total number of 3 dB steps to be applied is five (15 dB), the signal Step>>1 will be two (2*6 dB=12 dB), and the signal Step&1 will be one (1*3 dB).

Each bit shift by the right-shifting device 408 corresponds to an attenuation by 6 dB, approximately. Thus, the signal Step>>1 controls how many 6 dB attenuation steps should be applied by the right-shifting device 408. An output of the right-shifting device 408 is coupled to an input of a 3 dB attenuation device 412. Thus, the output of the 3 dB attenuation device 412 corresponds to a signal that is −3 dB below the output of the right-shifting device 408. An output of the 3 dB attenuation device 412 is coupled to an input of an input of a left-shifting device 416 that left-shifts by one bit. A left-shift by one bit corresponds to a gain of 6 dB, approximately. Thus, the output of the left-shifting device 416 corresponds to a signal that is +3 dB above the output of the right-shifting device 408.

An output of the right-shifting device 408 is also coupled to an input of a right-shifting device 420 that right-shifts by one bit. A right-shift by one bit corresponds to an attenuation of 6 dB, approximately. Thus, the output of the right-shifting device 420 corresponds to a signal that is −6 dB below the output of the right-shifting device 408.

The Mute Enable signal may be coupled to an enable input of the right-shifting device 420. Thus, when softmute should be applied, the right-shifting device 420 is enabled to right-shift by one bit the output of the right-shifting device 408. Otherwise, when softmute should not be applied, the right-shifting device 420 passes the output of the right-shifting device 408 unchanged. An inverter 424 receives the Mute Enable signal and generates an inverted Mute Enable signal, which is coupled to an enable input of the left-shifting device 416. Thus, when the softmute should be applied, the left-shifting device 416 passes the output of the 3 dB attenuation device 412 unchanged. Otherwise, when softmute should not be applied, the left-shifting device 416 is enabled to left-shift by one bit the output of the 3 dB attenuation device 412.

Outputs of the right-shifting device 408, the 3 dB attenuation device 412, the left-shifting device 416, and the right-shifting device 420 are coupled to inputs of a multiplexer 428. As described previously, the register 404 stores an indication of how many 3 dB attenuation steps should be applied to the audio signal. The least significant bit (Step&1) of the output of the register 404 may be provided as a control input to the multiplexer 428. The signal Step&1 indicates whether a 3 dB attenuation should be applied.

The multiplexer 428 selects one of a first pair of inputs and a second pair of inputs to be provided as a pair of outputs of the multiplexer 428. In particular, if the signal Step&1 is zero, the output of the right-shifting device 408 and the output of the left-shifting device 416 device will be selected. If mute is enabled, these inputs will correspond to the attenuation applied by the right-shifting device 408, and 3 dB below the attenuation applied by the right-shifting device 408. If mute is disabled, these inputs will correspond to the attenuation applied by the right-shifting device 408, and 3 dB above the attenuation applied by the right-shifting device 408. On the other hand, if the signal Step&1 is one, the output of the 3 dB attenuation device 412 and the right-shifting device 420 device will be selected. If mute is enabled, these inputs will correspond to 3 dB below the attenuation applied by the right-shifting device 408, and 6 dB below the attenuation applied by the right-shifting device 408. If mute is disabled, these inputs will correspond to 3 dB below the attenuation applied by the right-shifting device 408, and the attenuation applied by the right-shifting device 408.

A controller 432 may cause values in the register 404 to increment when mute is enabled and to decrement when mute is disabled. As the register 404 increments, successively greater attenuation is applied, and as the register 404 decrements, successively less attenuation is applied. The register 404 may be a counter that is controlled by the controller 432, or the controller 432 may cause incrementing/decrementing values to be loaded into the register 404. One parameter or separate parameters may indicate at what rate the register 404 should increment and decrement.

A first output 440 and a second output 444 of the multiplexer 428 correspond to two versions of the input signal that have been attenuated by two different degrees that are 3 dB apart. For example, when mute is enabled, the second output 444 is 3 dB below the first output 440. When mute is disabled, the second output 444 is 3 dB above the first output 440.

The outputs 440, 444 of the multiplexer 428 are coupled to an interpolator 450. The interpolator 450 calculates an interpolation between the outputs 440, 444. In particular, the relative weights accorded to the outputs 440, 444 changes over time so that the initially, the output of the interpolator 450 is merely the first output 440, and then gradually changes so that the output of the interpolator 450 ends up as the second output 444. In other words, when mute is enabled, the amount of attenuation initially corresponds to that of the first output 440 and gradually more attenuation is applied until the attenuation corresponds to 3 dB below the first output 440 (i.e., the attenuation corresponding to the second output 444). When mute is disabled, the amount of attenuation initially corresponds to that of the first output 440 and gradually less attenuation is applied until the attenuation corresponds to 3 dB above the first output 440 (i.e., the attenuation corresponding to the second output 444).

The interpolator 450 includes a subtractor 454 that subtracts the first output 440 from the second output 444. An output of the subtractor 454 is coupled to an input of a right-shifting device 458. The right-shifting device 458 divides the output of the subtractor 454 by a power of two. The number of shifts to be applied by the right-shifting device 458 is stored in a register 462 that is coupled to a control input of the right-shifting device 458.

An output of the right-shifting device 458 is coupled to a first input of a multiplier 466. A second input of the multiplier 466 is coupled to an output of a register 470. The controller 432 may cause values in the register 470 to increment. The register 470 may be a counter that is controlled by the controller 432, or the controller 432 may cause incrementing values to be loaded into the register 470.

An output of the multiplier 466 is coupled to an input of an adder 474. The output 440 is coupled to the other input of the adder 474. The output of the adder 474 corresponds to:

$$Y = A + \frac{(B-A)}{X} \cdot \alpha \qquad \text{(Equation 14)}$$

where A is the output 440, B is the output 444, X is the divisor applied by the right-shifting device 458, and α is the output of the register 470. Thus, when α is zero, the output of the interpolator 450 is A (the output 440). As a increases, the output of the interpolator 450 will correspond less to A (the output 440) and more to B (the output 444). Eventually, when α reaches the value X, the output of the interpolator 450 is B (the output 444). If the rate at which the register 470 increments remains the same, the register 462 (corresponding to X) affects how quickly the attenuation transitions from the attenuation corresponding to the output 440 (A) to the attenuation corresponding to the output 444 (B). The register 462 also affects how many steps occur in the transition from the attenuation corresponding to the output 440 (A) to the attenuation corresponding to the output 444 (B).

A multiplexer 480 has a first input coupled to the first output 440 of the multiplexer 428 and a second input coupled to the output of the adder 474. A register 484 has an output coupled to a control input of the multiplexer 480, and the value of the register 484 therefore controls which input of the multiplexer 480 is selected as the attenuated input. If the first input of the multiplexer 480 is selected, the interpolator 450 is bypassed, and the output of the attenuator 400 is merely the first output 440 of the multiplexer 428.

Referring again to FIG. 1, the attenuation applied by the audio attenuator 118 need not be applied to the output of the audio signal processor 116. For example, the attenuation could be applied between processing components within the audio signal processor 116, such as prior to a deemphasis filter. In other words, the audio attenuator 118 could be located prior to the deemphasis filter.

Figure 7:
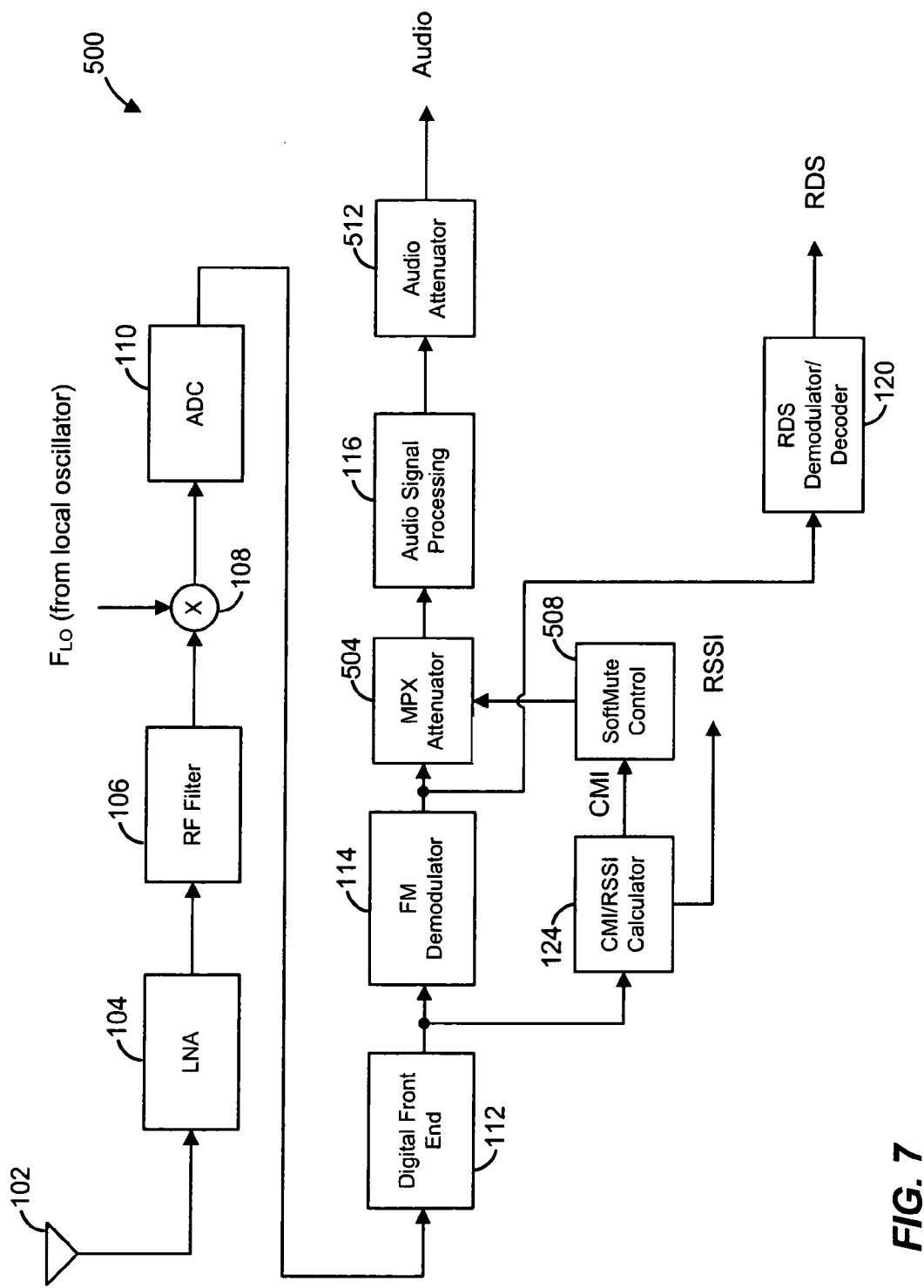
FIG. 7 is a block diagram of another example receiver that may utilize softmute controlled based on CMI.

Moreover, softmute attenuation may also be applied on the stereo multiplexed (MPX) signal, as opposed to the decoded audio signal. FIG. 7 is a block diagram of another example receiver 500 in which softmute attenuation is performed on the MPX signal. The receiver 500 includes an MPX attenuator 504 coupled between the FM demodulator 114 and the audio signal processor 116. A softmute control block 508 may generate an output based on the CMI signal, and the output of the softmute control block 128 is coupled to the MPX attenuator 504. Generally, the softmute control block 508 controls the MPX attenuator 504 to implement a softmute when the CMI signal indicates that the FM signal is impaired. In other words, the softmute control block 508 controls the MPX attenuator 504 to attenuate the MPX signal when the CMI signal indicates that the FM signal is impaired.

In FIG. 7, the RDS demodulator/decoder 120 is illustrated as being coupled to the output of the FM demodulator 114. Optionally, the RDS demodulator/decoder 120 may be coupled to the output of the MPX attenuator 504.

The receiver 500 also includes an audio attenuator 512, which may be unrelated to softmute and/or not controlled based on CMI. For example, the audio attenuator 512 may be controlled based on a user activatable volume control.

Figure 8:
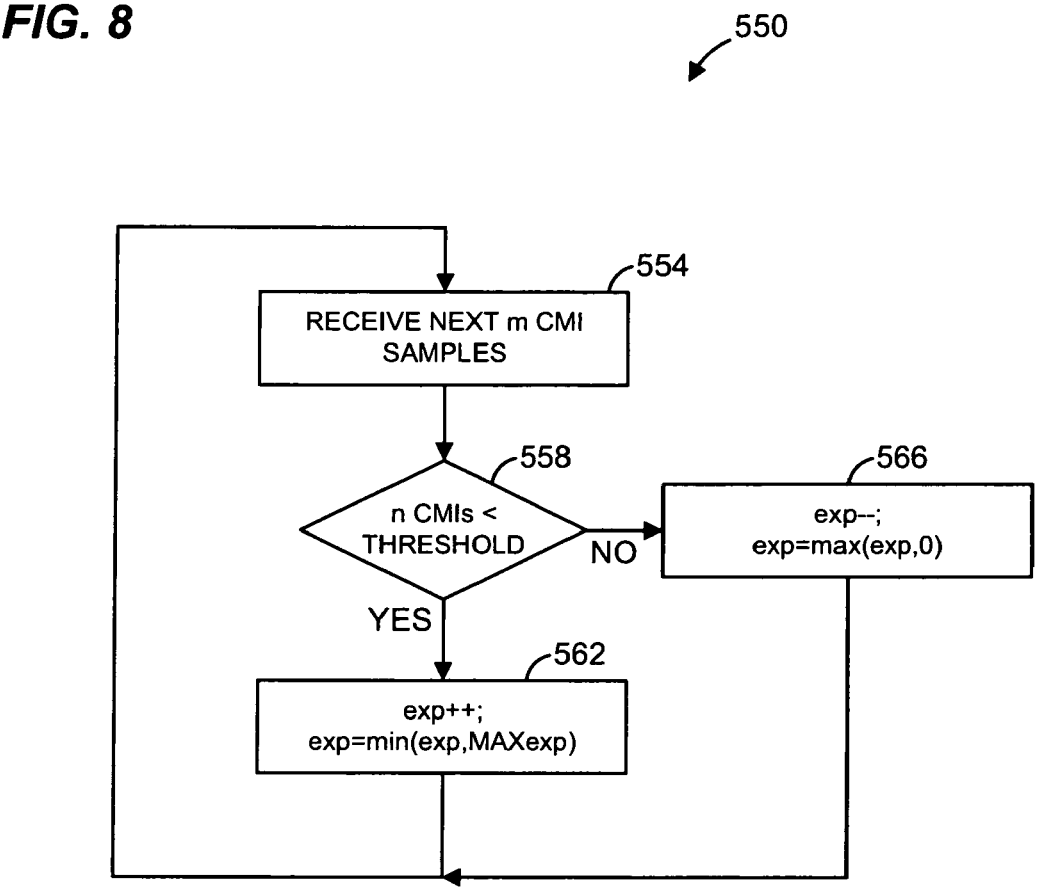
FIG. 8 is a flow diagram of an example method that may be implemented by the softmute control block of FIG. 7.

FIG. 8 is a flow diagram of an example method 550 that may be implemented by the softmute control block 508 of FIG. 7. If the softmute control block 508 implements the method 550, the softmute control block 128 may generate a control signal exp that indicates how much attenuation should be applied by the MPX attenuator 504. For example, the MPX attenuator 504 may comprise a right-shifting device, and the exp signal may indicate by how many bits the MPX signal should be right-shifted. It is to be understood, however, that the softmute control block 508 of FIG. 7 may implement a method different than the method 550. Additionally, the method 550 may be utilized in systems other than the example receiver 500 of FIG. 7. The method 550 may be implemented in hardware as a dedicated digital signal processor circuit or in software or firmware as computer executable instructions on a computer-readable medium accessible to a processor (such as a digital signal processor) and having instructions for implementing the procedures described herein. Also, the method 550 may be implemented as a combination of hardware, software, and/or firmware.

Initially, the control value exp may be set to zero. At a block 554, m CMI values are received. Next, at a block 448, it is determined whether n of the m CMI values fall below a threshold, where n is less than or equal to m. For example, it may be determined whether n of the m CMI values are less than the threshold or less than or equal to the threshold.

If n of the m CMI values fall below the threshold, the flow may proceed to a block 562. At the block 562, the control value exp may be incremented. If the new value of exp exceeds a maximum value (MAXexp), exp may be set to MAXexp. Then, the flow may proceed back to the block 554 to obtain the next m CMI values.

If at the block 448 it is determined that less than n of the m CMI values fall below the threshold, the flow may proceed to a block 566. At the block 566, the control value exp may be decremented. If the new value of exp is less than zero, exp may be set to zero. Then, the flow may proceed back to the block 554 to obtain the next m CMI values.

Although the softmute techniques described above were controlled based on CMI, it is to be understood that softmute may be controlled additionally based on other criteria as well, such as RSSI, a measure or indicator of adjacent channel interference, a measure or indicator of multipath fading, etc.

The softmute techniques such as described above may be utilized in various communication devices. In one example, softmute techniques such as described above may be utilized in a broadcast FM audio receiver. More generally, however, softmute techniques such as described above may be utilized in devices that utilize a modulation scheme in which the signal exhibits a constant modulus or that may be analyzed using a known constant modulus algorithm, and in which it is desired to attenuate a received signal when it is determined that the received signal is impaired.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method, comprising:
calculating a constant modulus indicator (CMI) measure for a received signal having a constant modulus component C and a noise component N, wherein the CMI measure indicates a ratio of an energy of C to an energy of N;

determining whether to attenuate a derived signal based on the CMI measure, wherein the derived signal is generated from the received signal; and attenuating the derived signal based on the determination.

2. The method of claim 1, wherein calculating the CMI measure comprises:

calculating a squared magnitude signal based on the received signal;

calculating a noise energy signal based on the squared magnitude signal and a prediction of the squared magnitude signal; and calculating the CMI measure based on the squared magnitude signal and the noise energy signal.

3. The method of claim 2, wherein calculating the CMI measure comprises:

accumulating the squared magnitude signal;

accumulating the noise energy signal; and calculating the CMI measure based on the accumulation of the squared magnitude signal and the accumulation of the noise energy signal.

4. The method of claim 3, wherein calculating the CMI measure comprises calculating a ratio of the accumulation of the squared magnitude signal to the accumulation of the noise energy signal.

5. The method of claim 4, wherein calculating the CMI measure comprises calculating a logarithm of the ratio of the accumulation of the squared magnitude signal to the accumulation of the noise energy signal.

6. The method of claim 2, wherein calculating the CMI measure comprises:

filtering the squared magnitude signal to generate a filtered squared magnitude signal;

filtering the noise energy signal to generate a filtered noise energy signal; and calculating the CMI measure based on the filtered squared magnitude signal and the filtered noise energy signal.

7. The method of claim 6, wherein calculating the CMI measure comprises calculating a ratio of the filtered squared magnitude signal to the filtered noise energy signal.

8. The method of claim 7, wherein calculating the CMI measure comprises calculating a logarithm of the ratio of the filtered squared magnitude signal to the filtered noise energy signal.

9. The method of claim 1, wherein calculating the CMI measure comprises:

calculating a squared magnitude signal based on the received signal;

filtering the squared magnitude signal to generate a filtered squared magnitude signal;

calculating a noise energy signal based on the squared magnitude signal and the filtered squared magnitude signal; and calculating the CMI measure based on the squared magnitude signal and the noise energy signal.

10. The method of claim 9, wherein calculating the noise energy signal comprises:

generating a difference signal based on the squared magnitude signal and the filtered squared magnitude signal; and generating the noise energy signal based on a magnitude of the difference signal.

11. The method of claim 1, wherein determining whether to attenuate the derived signal based on the CMI measure comprises comparing the CMI measure to a threshold.

12. The method of claim 1, wherein attenuating the derived signal based on the determination comprises:

incrementing an amount of attenuation over time when it is determined that the derived signal is to be attenuated; and decrementing the amount of attenuation over time when it is determined that the derived signal is not to be attenuated.

13. The method of claim 1, wherein the received signal is a broadcast frequency modulated audio signal;

wherein attenuating the derived signal comprises attenuating a decoded audio signal.

14. The method of claim 1, wherein the received signal is a broadcast frequency modulated audio signal;

wherein attenuating the derived signal comprises attenuating a stereophonic multiplex (MPX) signal.

15. An apparatus, comprising:

a constant modulus indicator (CMI) calculator to generate a CMI measure for a received signal having a constant modulus component C and a noise component N, wherein the CMI measure indicates a ratio of an energy of C to an energy of N;

a muting controller coupled to the CMI calculator to generate a muting control signal based on the CMI measure; and an attenuator coupled to the muting controller, the attenuator to apply attenuation to a derived signal in response to the muting control signal, wherein the derived signal is generated from the received signal.

16. The apparatus of claim 15, wherein the CMI calculator comprises:

a squared magnitude calculator to calculate a squared magnitude signal based on the received signal;

a noise energy calculator to generate a noise energy signal based on the squared magnitude signal and a prediction of the squared magnitude signal; and a computational block to calculate the CMI measure based on the squared magnitude signal and the noise energy signal.

17. The apparatus of claim 16, wherein the computational block to calculate the CMI measure comprises a processor coupled to a memory, wherein the memory has stored therein computer readable instructions that, when executed by the processor, cause the processor to calculate the CMI measure based on the squared magnitude signal and the noise energy signal.

18. The apparatus of claim 16, wherein the computational block to calculate the CMI measure comprises a logic circuit.

19. The apparatus of claim 16, wherein the CMI calculator further comprises:

an accumulator coupled to the squared magnitude calculator to generate an accumulated squared magnitude signal; and an accumulator coupled to the noise energy calculator to generate an accumulated noise energy signal;

wherein the computational block to calculate the CMI measure is configured to calculate the CMI based on the accumulated squared magnitude signal and the accumulated noise energy signal.

20. The apparatus of claim 19, wherein the computational block to calculate the CMI measure is configured to calculate a ratio of the accumulated squared magnitude signal to the accumulated noise energy signal.

21. The apparatus of claim 20, wherein the computational block to calculate the CMI measure is configured to calculate a logarithm of the ratio of the accumulated squared magnitude signal to the accumulated noise energy signal.

22. The apparatus of claim 16, wherein calculating the CMI measure comprises:
a filter coupled to the squared magnitude calculator to generate a filtered squared magnitude signal; and
a filter coupled to the noise energy calculator to generate a filtered noise energy signal;
wherein the computational block to calculate the CMI measure is configured to calculate the CMI measure based on the filtered squared magnitude signal and the filtered noise energy signal.

23. The apparatus of claim 22, wherein the computational block to calculate the CMI measure is configured to calculate a ratio of the filtered squared magnitude signal to the filtered noise energy signal.

24. The apparatus of claim 15, wherein the CMI calculator comprises:
a squared magnitude calculator to calculate a squared magnitude signal based on the received signal;
a filter coupled to the squared magnitude calculator to generate a filtered squared magnitude signal;
a noise energy calculator to generate a noise energy signal based on the squared magnitude signal and the filtered squared magnitude signal; and
a calculator block to calculate the CMI measure based on the squared magnitude signal and the noise energy signal.

25. The apparatus of claim 24, wherein the noise energy calculator comprises:
a subtractor to generating a difference signal based on the squared magnitude signal and the filtered squared magnitude signal;
a magnitude calculator coupled to the subtractor; and
a filter coupled to the magnitude calculator to generate the noise energy signal based on an output of the magnitude calculator.

26. The apparatus of claim 24, wherein the calculator block comprises:
a first decibel converter coupled to the filter;
a second decibel converter coupled to the noise energy calculator; and
a subtractor to calculate a difference between an output of the first decibel converter and an output of the second decibel converter.

27. The apparatus of claim 15, wherein the muting controller is configured to compare the CMI measure to a threshold.

28. The apparatus of claim 15, wherein the muting controller is configured to generate the muting control signal to indicate whether muting is on or muting is off.

29. The apparatus of claim 28, wherein the muting controller is configured to generate the muting control signal to indicate a degree of attenuation to be applied to the derived signal.

30. The apparatus of claim 15, wherein the attenuator is configured to:
increment an amount of attenuation over time when the control signal indicates that the derived signal is to be attenuated, and
decrement the amount of attenuation over time when the control signal indicates that the derived signal is not to be attenuated.

31. A method of processing a received signal, the method comprising:
downconverting the received signal to a baseband signal having a constant modulus component C and a noise component N;
demodulating the baseband signal to generate demodulated baseband signal;
processing the demodulated baseband signal;
calculating a constant modulus indicator (CMI) measure for the baseband signal, wherein the CMI measure indicates a ratio of an energy of C to an energy of N;
determining whether to attenuate the demodulated baseband signal based on the CMI measure; and
attenuating the demodulated baseband signal based on the determination.

32. The method of claim 31, wherein the received signal is a broadcast frequency modulated audio signal;
wherein the demodulated signal is a stereophonic multiplex (MPX) signal; and
wherein processing the demodulated baseband signal includes decoding the MPX signal to generate an audio signal.

33. The method of claim 32, wherein attenuating the demodulated baseband signal comprises attenuating one of the MPX signal or the audio signal.

34. A receiver, comprising:
a downconverter to downconvert a received signal to a baseband signal having a constant modulus component C and a noise component N;
a demodulator to generate a demodulated baseband signal;
a signal processor to process the demodulated baseband signal;
a constant modulus indicator (CMI) calculator to generate a CMI measure for the baseband signal, wherein the CMI measure indicates a ratio of an energy of C to an energy of N;
a muting controller coupled to the CMI calculator to generate a muting control signal based on the CMI measure; and
an attenuator coupled to the muting controller, the attenuator to apply attenuation to the demodulated baseband signal in response to the muting control signal.

35. The apparatus of claim 34, wherein the demodulator is a frequency modulation (FM) demodulator configured to generate a stereophonic multiplex (MPX) signal; and
wherein the signal processor is configured to decode the MPX signal to generate an audio signal.

36. The apparatus of claim 35, wherein the attenuator is coupled to the FM demodulator and is configured to attenuate the MPX signal in response to the muting control signal.

37. The apparatus of claim 35, wherein the attenuator is coupled to the signal processor and is configured to attenuate the audio signal in response to the muting control signal.

* * * * *